3,306,894
4,6-INDAZOLE DERIVATIVES OF ESTRONE AND ESTRADIOL-17β

Edward Warren Cantrall and Seymour Bernstein, New City, N.Y., assignors to American Cyanamid Company, Stamford, Conn., a corporation of Maine
No Drawing. Filed May 10, 1965, Ser. No. 454,670
4 Claims. (Cl. 260—239.5)

This invention relates to new steroid compounds. More particularly, it relates to 4,6-indazolo-derivatives of estrone and estradiol-17β and methods of preparing the same.

The new compounds of the present invention may be illustrated by the following formula:

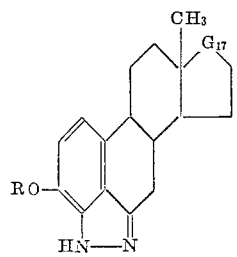

wherein R is a member of the group consisting of hydrogen and lower alkyl such as methyl, ethyl, propyl, isopropyl and the like; $C_{17}$ is selected from the group consisting of

and

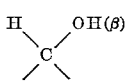

The novel ocmpounds of the invention are, in general, crystalline solids, somewhat soluble in the common organic solvents.

The present compounds are prepared from 4-aminoestrone lower alkyl ethers the preparation of which is described in the prior art. The latter compounds are diazotized by the addition of a mineral acid and alkali metal nitrite and then reacted with a solution of fluoroboric acid. The products resulting are 3-lower alkoxyestra - 1,3,5(10)-trien-17-on-4-yl-diazonium fluoroborate. The latter on treatment with an alkali metal fluoride in the presence of acetic acid produces 9H-benz[cd]indeno [5,4-f]indazol-9-one, 4,6,6β,6b,8,9a,10,11,11a-decahydro-3-lower alkoxy-9α-methyl. The latter reaction may be accelerated by irradiation with ultraviolet light.

The present compounds may also be prepared by reacting the diazonium compounds prepared above with anhydrous tetramethyl ammonium acetate in an anhydrous solvent.

The following flow sheet illustrates the process of the present invention.

FLOW SHEET

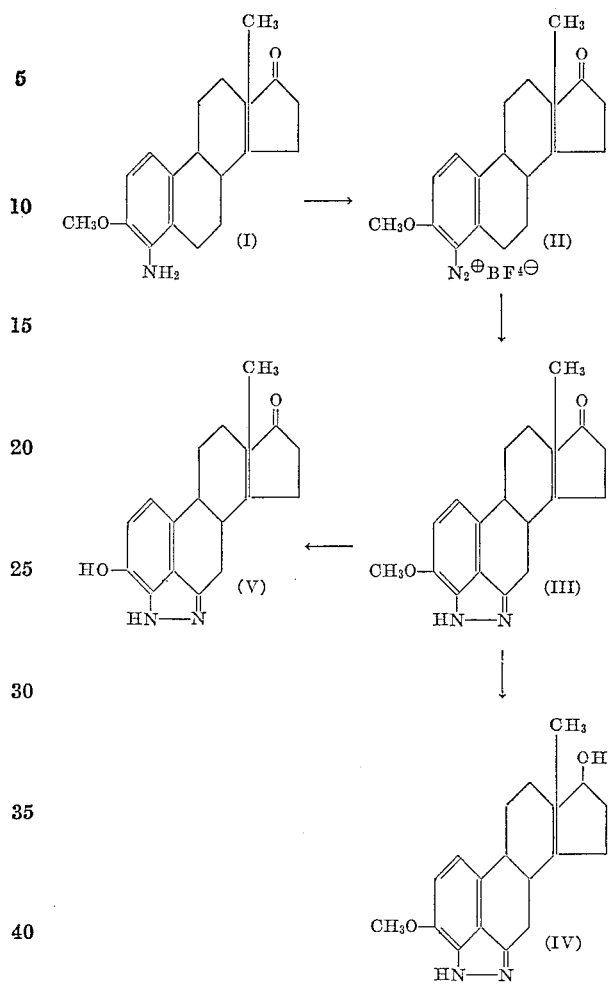

The compounds of the present invention produce lowering of blood cholesterol in rats which is indicative of use as hypercholesteremic agents.

The following examples describe in detail the preparation of representative compounds of the present invention.

EXAMPLE 1

9H-benz[cd]indeno[5,4-f]indazol-9-one, 4,6,6a,6b,8,9a, 10,11,11a-decahydro-3-methoxy-9a-methyl (III)

To a slurry of 7.5 g. of 4-aminoestrone methyl ether (I) [J. Am. Chem. Soc., 81, 1702 (1959)] in 200 ml. of 3% hydrochloric acid is added a solution of 2.0 g. of sodium nitrite in 10 ml. of water. The resulting solution is stirred for 10 minutes at 0° C. and is then treated with 12 ml. of a 48–50% solution of fluoroboric acid. The mixture is stirred ten minutes, filtered and the product is washed well with water and dried under reduced pressure over phosphorus pentoxide to give 8.3 g. (83%) 3-methoxyestra - 1,3,5(10)-trien-17-on-4-yl-diazonium fluoroborate, melting point 156.5° C., dec. (II).

The mixture containing 0.841 g. of potassium fluoride (dihydrated) and 3.98 g. of the diazonium fluoroborate salt (II) derived from 4-aminoestrone methyl ether (described above) in 100 ml. of glacial acetic acid is stirred for 20 minutes at 15° C. under a nitrogen atmosphere and is then irradiated in a quartz vessel under the same conditions for 3½ hours with a 200 watt Hanovia high pressure mercury air lamp. The reaction mixture is then allowed to stand overnight during which time a slow stream of nitrogen is bubbled through it. The inorganic salt which precipitates is filtered and washed with acetic acid. The filtrate is evaporated under reduced pressure at 55°–60° C., and the residue is partitioned between methylene chloride and saturated sodium bicarbonate. The methylene chloride solution is washed with water, dried over anhydrous sodium sulfate and evaporated. The residue is triturated with hot ethyl acetate and the insoluble portion is filtered to give 0.996 g. (32%) 9H-benz[cd]indeno[5,4-f]indazol-9-one, 4,6,6a,6b,8,8a,10,11, 11a-decahydro-3-methoxy-9a-methyl (III), melting point 303° C., dec. A sample for analysis is recrystallized from methylene chloride-methanol and has melting point 321°–325° C., dec.; $[\alpha]_D$ +57° ($CHCl_3$);

$\lambda_{max.}^{MeOH}$ 256, 264, 294 and 300 m$\mu$ ($\epsilon$ =5840, 5530, 7020 and 6030, respectively).

The residue (1.97 g.) remaining after evaporation of the trituration liquor was redissolved in ethyl acetate and adsorbed on silica gel. Elution with 10% ethyl acetate-benzene gives 1.14 g. of 4-acetoxy-3-methoxyestra-1,3,5 (10)-trien-17-one, melting point 211°–215° C. A specimen for analysis was recrystallized several times from methanol and had melting point 214°–217.5° C.; $[a]_D$ +132;

$\lambda_{max.}^{MeOH}$ 273 and 280 m$\mu$ ($\epsilon$ =1540, 1485 respectively)

EXAMPLE 2

*9H-benz[cd]indeno[5,4-f]indazol-8-one, 6,6,6a,6b,8,9a 10,11,11a-decahydro-3-methoxy-9α-methyl (III)*

A solution of 4-amino-3-methoxyestra-1,3,5(10)-trien-17-one (I) in glacial acetic acid at 0° is treated with 3 mols of hydrogen chloride followed by 1.2 mole of sodium nitrite. The resulting diazonium chloride is precipitated with ether, collected by filtration and dried. The latter is added to a solution containing anhydrous tetramethyl ammonium acetate in alcohol-free chloroform and stirred for 24 hours at room temperature. The mixture is washed repeatedly with water, dried and evaporated. The residue is crystallized from methylene chloride-methanol to give 9H-benz[cd]indeno[5,4-f]indazol-8 - one, 6,6,6a,6b,8,9a,10,11,11a-decahydro-3-methoxy-9α-methyl (III).

EXAMPLE 3

*9H-benz[cd]indeno[J,4-f]indazol-9β-ol,4,6,6a,6b,8,8a, 10,11,11a-decahydro-3-methoxy-9a-methyl*

Reduction of the product of Example 2 in methanol with sodium borohydride gives the 17β-hydroxy compound IV, 9H-benz[cd]indeno[J,4-f]indazol-9β-ol,4,6,6a, 6b,8,8a,10,11,11a-decahydro-3-methoxy-9a-methyl.

EXAMPLE 4

*9H-benz[cd]indeno[J,4-f]indazol-9-one,4,6,6a,6b,8,8a, 10,11,11a-decahydro-3-hydroxy-9a-methyl*

Treatment of the product of Example 2 with pyridine hydrochloride followed by neutralization gives the 3-hydroxy compound V, 9H-benz[cd]indeno[J,4-f]indazol-9-one,4,6,6a,6b,8,8a,10,11,11a-decahydro - 3 - hydroxy - 9α-methyl.

We claim:
1. A compound of the formula:

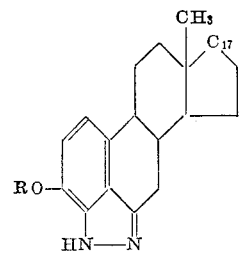

wherein R is a member of the group consisting of hydrogen and lower alkyl and $C_{17}$ is a member of the group consisting of

and

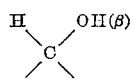

2. The compound of the formula:

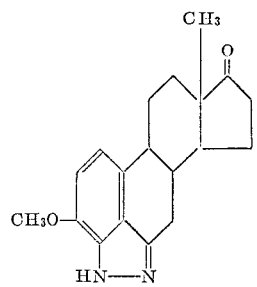

3. The compound of the formula:

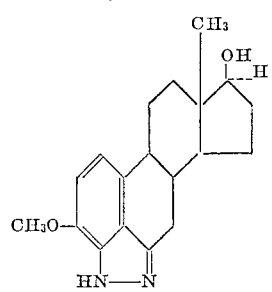

4. The compound of the formula:

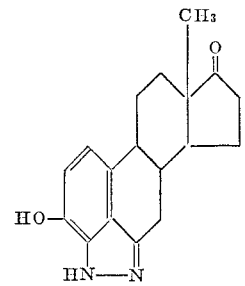

No references cited.

ELBERT L. ROBERTS, *Primary Examiner.*